Figure 1:
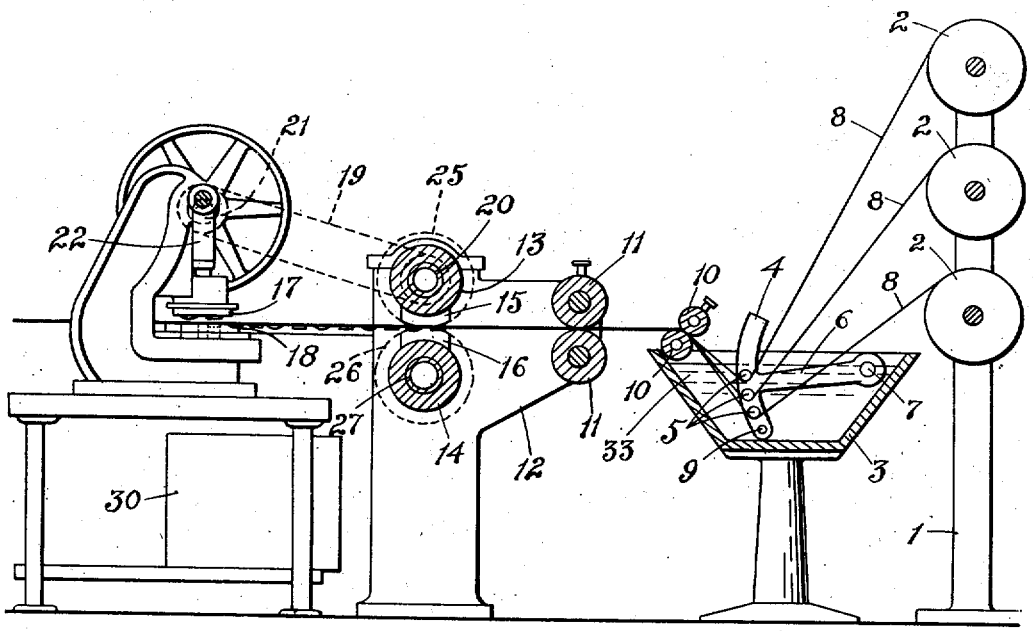

Jan. 2, 1923. Re. 15,517

G. P. MALLORY.

APPARATUS FOR MAKING PAPER SPOONS AND OTHER FLAT PAPER UTENSILS.

ORIGINAL FILED OCT. 18, 1921.

INVENTOR:

George Price Mallory by Macleod, Calm Copeland & Dike

Attys.

Reissued Jan. 2, 1923. Re. 15,517

UNITED STATES PATENT OFFICE.

GEORGE PRICE MALLORY, OF PHILADELPHIA, PENNSYLVANIA, ASSIGNOR, BY MESNE ASSIGNMENTS, TO SANITARY PRODUCTS CORPORATION OF AMERICA, OF PHILADELPHIA, PENNSYLVANIA, A CORPORATION OF VIRGINIA.

APPARATUS FOR MAKING PAPER SPOONS AND OTHER FLAT PAPER UTENSILS.

Original No. 1,394,037, dated October 18, 1921, Serial No. 326,599, filed September 26, 1919. Application for reissue filed March 6, 1922. Serial No. 541,585.

*To all whom it may concern:*

Be it known that I, GEORGE P. MALLORY, a citizen of the United States, residing at Philadelphia, county of Philadelphia, State of Pennsylvania, have invented a certain new and useful Improvement in Apparatus for Making Paper Spoons and Other Flat Paper Utensils, of which the following is a specification, reference being had therein to the accompanying drawings.

It has been common heretofore to make cheap spoons, that are intended to be used but once, out of vulcanized fibre. Spoons of this character have been formed by dieing out a blank from a sheet of fibre and stamping it to the proper shape. In such case, there has been a great waste of material, usually about 33⅓ per cent, which has been burned because there appeared to be no economical use for it. This has been a dead loss, and owing to the high cost of the raw material, it has constituted a great financial waste. The object of the present invention is to provide a method of and apparatus for making spoons and other articles of flat ware type out of wood pulp paper in such manner that the waste can be redeemed and the article itself shall be harder, stronger and cheaper than those heretofore produced from vulcanized fibre. The invention consists substantially in passing a plurality of laminae of wood pulp paper through a tank containing a solution forming a plastic filler, then running the laminæ superposed one upon the other through a series of suitable rolls to leave the proper amount of filler in the laminæ, then calendering the laminated sheet and stamping or embossing the design of spoon or other article in the sheet, then passing the sheet to a press which blanks out the article from the embossed sheet.

The invention is more particularly intended to be employed in the manufacture of fibre spoons, and for that reason the drawings show a spoon design. For convenience of description, the word "spoons" will be sometimes employed in the specification, but wherever so used, it is to be understood that it covers any utensil or other article of the flat ware type capable of being made by the machine if the proper dies are substituted.

The invention will be fully understood from the following description when taken in connection with the accompanying drawings, and the novel features thereof will be pointed out and clearly defined in the claims at the close of this specification.

In the drawings, Fig. 1 is a side elevation partly in section of a machine embodying the invention.

Figure 2:
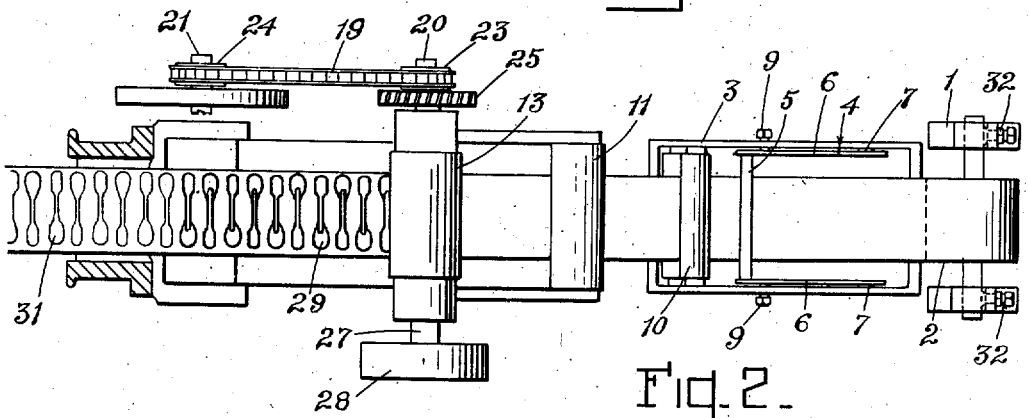

Fig. 2 is a plan view partly in section of the machine embodying the invention shown in Figure 1.

Referring now to the drawings, 1 is a stand on which are mounted a plurality of reels 2, 2, 2, which carry rolls of thin paper. In the drawings, three of such rolls are shown, but the number may be more or less according to the number of laminæ or thickness desired for the blank sheet from which the spoons are to be formed. Preferably, the sheets are of a width amply sufficient to allow for the length of a spoon cut transversely of the sheet.

A tank 3 is provided adjacent the stand on which the rolls of paper are mounted, said tank containing a plastic solution 33. A rack 4 containing guide rods 5 which serve as spacing rods is pivotally mounted in the tank. In the form of device shown, the rack is provided with arms 6 which are pivoted at 7 within the tank. The said rolls 5 are spaced apart from each other and are sufficient in number so that the laminæ of paper from the several rolls will each pass separately under its individual guide rod. Said rods thereby guide the laminæ through the solution in the tank and maintain them separated from each other so that both faces of each of the laminæ will more readily absorb the solution.

The rack is pivoted inside of the tank so that it can be lifted out of the solution to allow threading the paper through the machine, and it is also provided with lock bolts 9 to hold it down in place when tension is put on the rolls of paper in feeding them through the machine. The rolls of paper are provided with friction clamps 32 to give the right amount of tension.

Near the upper edge of the tank on the side opposite that on which the reel stand is located are a pair of doctor rolls 10, 10 between which the several laminæ of paper pass as they leave the tank. In passing between the doctor rolls, the laminæ will be in contact with each other, superposed one upon the other. The doctor rolls are adjustable to give the right pressure so as to leave the proper amount of the plastic solution in the paper.

After leaving the doctor rolls, the superposed laminæ pass between two calender rolls 11, 11 mounted on a suitable support 12, to give the proper finish to the compound sheet formed of the several laminæ and thence it passes between two rotary embossing rolls 13, 14. The upper embossing roll 13 is provided with at least one embossing die 15 on its periphery, and the embossing roll 14 is provided with at least one embossing die 16 on its periphery so located as to cooperate with the embossing die 15, one of said dies being a male die and the other a female die, so that when the sheet passes between the said embossing members, the desired form of spoon will be embossed in the sheet to give the proper shape to the bowl and shank and handle. Preferably, the dies are heated by any suitable means. One method is to pass steam through the hollow shafts 20 and 27 on which the rolls 13 and 14 are mounted. The peripheries of these embossing dies are curved on an arc of a circle concentric with the rolls 13, 14 on which they are mounted. Preferably, each embossing die is made with duplicate patterns so that each pair of male and female dies will emboss two spoons at each action. In order to leave as little waste as possible, it is preferable to form the two patterns on each die parallel with each other, and with the bowls pointing in opposite directions, as will be seen in Figure 2. Preferably, there are two embossing dies mounted on each embossing roll, one being diametrically opposite the other so that at each complete rotation of the roll, two sets of the embossing dies will successively come into operation, thus giving a greater capacity of production. Each embossing die from front to rear extends less than one-half the circumference of the embossing roll, that is, the two embossing dies on a single roll do not meet each other, so that there is always a partial rotation of the embossing rolls 13, 14 after one set of embossing dies 15, 16 rotates out of contact with the sheet before the opposite set of embossing dies comes in contact with the sheet. As the embossing dies constitute the sheet feed, there will thus be an intermittent movement of the sheet although the rolls rotate continuously, the dwell of the sheet continuing from the time one set of embossing dies passes out of engagement with the sheet until the next set of embossing dies comes into engagement with the sheet to continue the feed. There will thus be two spoons embossed at a time by each pair of dies, and four spoons at each complete rotation of the roll, with a dwell of the sheet between the action of the two sets of dies.

After passing between the embossing dies, the sheet is guided between the two blanking out members 17, 18 of a press.

The press is a power press, the upper die 17 being movable vertically and driven by a suitable driving connection between the shaft 20 on which the upper embossing roll 13 is mounted and the shaft 21 which actuates the plunger 22 which carries the upper blanking die 17. The driving connection shown consists of a chain 19 which runs over a sprocket 23 on the shaft 20 and over a sprocket 24 on the shaft 21. Mounted on shaft 20 is a spiral gear 25 which meshes with a spiral gear 26 on a shaft 27 of the embossing roll 14, said shaft 27 having mounted thereon a driving pulley which is driven by any suitable means.

The shaft 21 is connected with suitable mechanism whereby the plunger 22, and therefore the movable blanking die 17, is vertically reciprocated in the well known manner of operating power presses. It is not deemed necessary to show the details of construction. It is timed in such manner that the latter part of the downward stroke of the blanking member 17 will take place during the dwell in the process of feeding the sheet and will be lifted from the sheet before the forward feed again begins.

In Figure 2, a series of spoon embossings 29 is shown as they appear embossed in the strip after passing between the embossing rolls before the blanks are cut from the sheet. The spoon blanks are then cut out by the blanking dies 17 and 18. The spoons drop down through the dies into a suitable receptacle 30. The openings 31 in the sheet show where the spoons have been died out.

The plastic solution is simply a bonding material for cementing the laminæ of paper together, and by giving the embossing rolls the proper degree of heat, the bonded paper becomes hard. The degree of heat, however, is not sufficient to destroy the fibre of the paper, and the scrap can be returned to the paper mill, put through the beaters, and used over again.

While obviously adapted for the purpose of making other small irregularly shaped articles from paper or similar sheet material, the process and apparatus herein described have, as above pointed out, been devised primarily for the manufacture of spoons, forks, and similar utensils known in the trade as flat tableware. The term "flat" as herein used is, therefore, employed in this particular or technical sense and is not intended to imply that the several parts of the object in question all lie within or closely adjacent to a single plane. On the contrary, the articles formed are not only more or less irregular in outline, when viewed in plan, but are also, as to their several parts, more or less offset in one direction or another from a given plane, so as to present a contour or profile which is also more or less irregular in a direction or dimension transverse to the plane or other surface in which the outline lies. The term "form" as used in the claims is intended to refer to this contour of the article within its outline and with respect to the plane or surface in which said outline is included.

What I claim is:—

1. An apparatus for forming paper spoons or other articles, having a pair of cooperating rotary embossing rolls between which a sheet of material from which the articles are to be formed is fed, each roll having on its periphery an embossing die, said dies extending only partially around the circumference of the roll and being raised above the surfaces of the roll so that there is a space between the two ends of the die which does not engage with the sheet, thereby causing a dwell in the movement of the sheet between the time that the last engaging portion of the die passes out of engagement with the sheet and the time when the first engaging portion of the die again comes in contact with the sheet, in combination with a pair of cutting dies between which the sheet is fed from the embossing rolls, said cutting dies being shaped to a contour to cut out the embossed blank from the sheet, and means for driving the embossing dies and the cutting dies in such timed relation to each other that the cutting dies will be operated during the dwell in the travel of the sheet occasioned by the blank spaces between the two ends of the embossing dies.

2. An apparatus for forming paper spoons or other articles, having a pair of cooperating rotary embossing rolls between which a sheet of material from which the articles are to be formed is fed, each roll having on its periphery an embossing die, one of said dies being a male die and the other a female die, the periphery of each die being curved on the arc of a circle concentric with the roll on which it is mounted, the said two dies being so disposed on the peripheries of their respective rolls that at each rotation of the rolls the sheet which is being fed through will be engaged by both of said dies, thereby embossing and feeding the sheet, said dies extending only partially around the circumference of the roll and being raised above the surfaces of the roll so that there is a space between the two ends of the die which does not engage with the sheet, thereby causing a dwell in the movement of the sheet between the time that the last engaging portion of the die passes out of engagement with the sheet and the time when the first engaging portion of the die again comes in contact with the sheet, in combination with a pair of cutting dies between which the sheet is fed from the embossing rolls, said cutting dies being shaped to a contour to cut out the embossed blank from the sheet, and means for driving the embossing dies and the cutting dies in such timed relations to each other that the cutting dies will be operated during the dwell in the travel of the sheet occasioned by the blank spaces between the two ends of the embossing dies.

3. An apparatus for making paper utensils which comprises embossing dies to impress upon the stock the shape and outline of the article to be formed, and cutting dies which sever the article from the stock along the outline so formed, said apparatus including provision for feeding the stock from the embossing dies to the cutting dies.

4. An apparatus for making paper utensils which comprises embossing dies to impress upon a sheet of material successive impressions having the form and outline of the finished article, cutting dies of the same size and shape to sever the outline already embossed thereon, and means for actuating said dies to cause the same to operate upon the sheet successively, said apparatus having provision for feeding the sheet from the embossing dies to said cutting dies.

5. An apparatus for forming paper utensils comprising a pair of continuously rotating embossing rolls provided with dies which extend only partially around said rolls and by means of which rolls the stock is fed forward intermittently, and which dies impress the stock into the form and outline of the finished article, combined with blanking or cutting dies which sever the article at the outline formed by the embossing dies, while the stock is at rest between feeding movements, and eject the finished article from the stock.

6. An apparatus for forming articles having a non-flat surface out of a strip of flat sheet material, comprising embossing dies which emboss in a portion of the strip the shape of the finished article, a cutting die having a cutting edge whose contour corresponds with the outer contour of the shaped article, means whereby the cutting die is actuated to sever the shaped article from the strip, and means whereby the embossing dies feed the embossed portion of the strip to position for being acted upon by the cutting die.

7. An apparatus for forming articles having a non-flat surface out of a strip of flat sheet material, comprising embossing dies which emboss in a portion of the strip the shape of the finished article, a cutting die having a cutting edge whose contour corresponds with the outer contour of the shaped article, means whereby the cutting die is actuated to sever the shaped article from the strip, and means whereby the embossing dies intermittingly feed the embossed portion of the strip to position for being acted upon by the cutting die.

8. An apparatus for forming articles out of a strip of sheet material, comprising a pair of rotary embossing dies between which the strip is fed and which impress upon a portion of the strip the shape of the article to be formed, and a pair of cutting dies between which the strip is fed by the embossing dies in such a manner as to position the embossed portion of the strip in proper relation to the cutting dies, one of said cutting dies having a cutting edge whose contour corresponds with the outline of the finished article.

9. An apparatus for forming articles out of a strip of sheet material, comprising a pair of rotary embossing dies between which the strip is fed and which impress upon a portion of the strip the shape of the article to be formed, and a pair of rotary cutting dies between which the strip is fed by the embossing dies in such a manner as to position the embossed portion of the strip in proper relation to the cutting dies, one of said cutting dies having a cutting edge whose contour corresponds with the outline of the finished article.

In testimony whereof I affix my signature.

GEORGE PRICE MALLORY.